United States Patent [19]

Noda

[11] Patent Number: 4,772,898

[45] Date of Patent: Sep. 20, 1988

[54] RECORDING APPARATUS

[75] Inventor: Atsushi Noda, Yokohama, Japan

[73] Assignee: Canon Kabushiki Kaisha, Tokyo, Japan

[21] Appl. No.: 105,485

[22] Filed: Oct. 1, 1987

Related U.S. Application Data

[63] Continuation of Ser. No. 776,980, Sep. 17, 1985, abandoned.

[30] Foreign Application Priority Data

Sep. 26, 1984 [JP] Japan ................................ 59-199515

[51] Int. Cl.[4] .......................... G01D 15/24; B41J 3/20; B41J 23/24

[52] U.S. Cl. .................................... 346/136; 346/141; 400/124; 400/185; 400/187; 400/314

[58] Field of Search .............. 346/76 PH, 136, 140 R, 346/141; 400/124, 185, 187, 313, 314

[56] References Cited

U.S. PATENT DOCUMENTS

| | | | |
|---|---|---|---|
| 4,062,436 | 12/1977 | Kondur, Jr. et al. | 400/613 |
| 4,265,551 | 5/1981 | Adamek et al. | 400/221.1 |
| 4,347,006 | 8/1982 | Shakib | 400/187 |
| 4,431,319 | 2/1984 | Karani et al. | 400/124 |
| 4,538,931 | 9/1985 | Nagashima | 400/185 |
| 4,542,384 | 9/1985 | Tazaki | 346/33 R X |
| 4,565,461 | 1/1986 | Usui et al. | 400/611 X |

FOREIGN PATENT DOCUMENTS

| | | |
|---|---|---|
| 57-38165 | 3/1982 | Japan . |
| 59-145175 | 8/1984 | Japan . |
| 59-145176 | 8/1984 | Japan . |

*Primary Examiner*—E. A. Goldberg
*Assistant Examiner*—Gerald E. Preston
*Attorney, Agent, or Firm*—Fitzpatrick, Cella, Harper & Scinto

[57] ABSTRACT

This specification discloses a recording apparatus for recording an image corresponding to image information on a sheet. More particularly, the specification discloses a recording apparatus for recording an image corresponding to image information on a sheet which apparatus has a head for effecting recording in the form of a dot matrix, a support device for movably supporting the head, a conveying device for conveying the sheet, and a drive source for imparting a drive force for causing the head to scan a plurality of times each time one line is recorded and a drive force for driving the conveying device.

3 Claims, 7 Drawing Sheets

RECORDING APPARATUS

This application is a continuation of application Ser. No. 776,980 filed Sept. 17, 1985, now abandoned.

BACKGROUND OF THE INVENTION

1. Field of the Invention

This invention relates to a recording apparatus such as a thermal printer, an impact printer or an ink jet printer. The present invention also relates to a recording apparatus in which a head is moved across a recording sheet to thereby accomplish printing of characters, numerals, etc. or recording of images such as figures.

2. Description of the Prior Art

Various types of recording apparatuses have heretofore been proposed and recently, with the spread of word processors, the demand for a compact and inexpensive printing apparatus which can print characters, numerals and figures of high quality has been rising.

Particularly, in Japanese word processors, chinese characters cannot be expressed unless use is made of a dot matrix comprised of a minimum of sixteen vertical and horizontal dots and therefore, it has been necessary to construct a recording apparatus by using a printing head having 16 or more dots in a column.

An increase in the number of component dots would not only make the printing head bulky and expensive, but also made the control circuit for driving the printing head complex and accordingly make the recording apparatus bulky and expensive.

SUMMARY OF THE INVENTION

It is an object of the present invention to provide a recording apparatus which can accomplish image recording of high quality.

It is another object of the present invention to provide a compact recording apparatus.

It is still another object of the present invention to provide a recording apparatus which can effect movement of a head and conveyance of a sheet by the same drive source.

It is yet still another object of the present invention to provide a recording apparatus which can accomplish image recording of high quality by a head having a small number of dots.

It is a further object of the present invention to provide an inexpensive recording apparatus.

DESCRIPTION OF THE PREFERRED EMBODIMENT

The present invention will hereinafter be described in greater detail with respect to an embodiment thereof.

Figure 1:
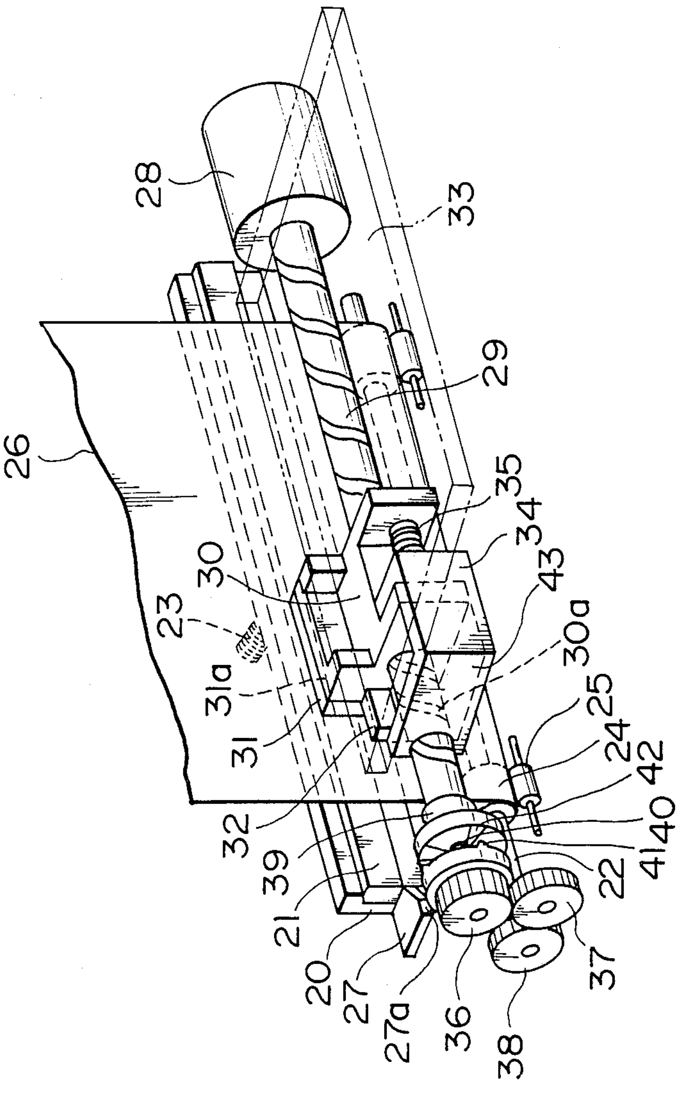
FIG. 1 is a perspective view of a printer apparatus to which an embodiment of the present invention is applied.

The drawings illustrate an embodiment of the present invention, and FIG. 1 shows the structure of the entire embodiment.

In FIG. 1, reference numeral 20 designates a platen holder. A platen 21 is mounted on this side of the platen holder 20. The platen holder 20 has its lower end rotatably supported by a rubber roller shaft 22. The platen holder 20 has its side surface opposite to that side thereof on which the platen 21 is provided, pressed by a spring 23 provided between the platen holder and the fixed portion of a printing apparatus, not shown, and is rotatively biased toward a carriage 30 which will later be described. A rubber roller 24 is fixed to the rubber roller shaft 22 at the opposite sides of the lower end of the platen holder 20. Further, a pinch roller 25 is in contact with the rubber roller 24 with a recording sheet 26 nipped therebetween.

Also, an engaging portion 27 having a cam surface 27a bulged toward this side is projectedly provided at the end portion on one side of the platen holder 20, for example, the left side in FIG. 1 which is the home position side of the carriage 30.

Further, at a position opposed to the platen 21, a lead screw 29 which is a cam member rotated by a motor 28 is disposed parallel to the platen 21. The carriage 30 formed with an internal thread 30a is fitted to the lead screw 29. Accordingly, when the motor 28 is revolved in forward and reverse directions, the lead screw 29 also follows it and the carriage 30 can be reciprocated to the left and right along the lead screw 29.

Figure 7:
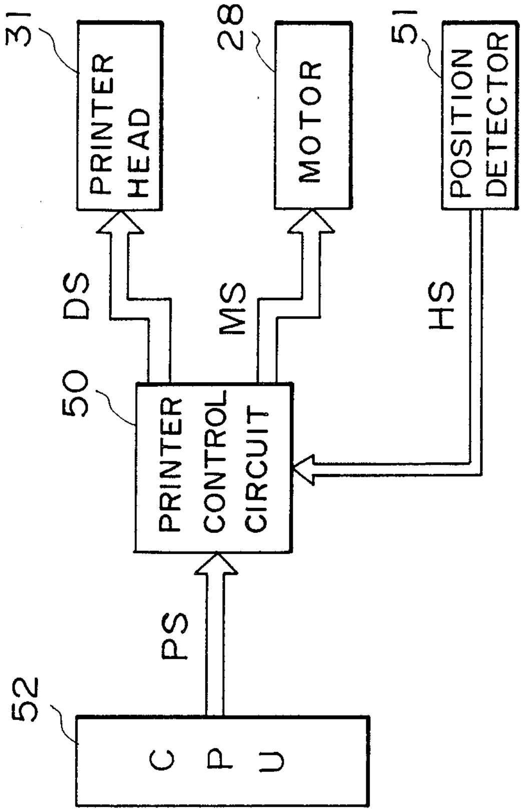
FIG. 7 is a block diagram of the present embodiment.

The carriage 30 is provided with a thermal head 31, for example, of $1\times8$ dots disposed in opposed relationship with the platen 21, and recording can be effected in the form of a dot matrix on the recording sheet 26 by the thermal head 31. The platen 21 is pressed against the thermal head 31 by the spring 23. Reference numeral 31a designates a heat generating element provided on the thermal head 31 and adapted to generate heat in response to an image information signal from a CPU 52 (FIG. 7). The CPU 52 is a central operation processing circuit which effects the driving control of the entire printer apparatus.

A projection 32 of a predetermined length is projectedly provided on that side surface of the carriage 30 which is adjacent to the engaging portion 27. This projection 32 lies in a position in which it is engageable with the engaging portion 27 when the carriage 30 has returned to its home position. The carriage 30 is guided by a guide rail 33 so as not to be rotated with the rotation of the lead screw 29. The carriage 30 is provided with a set arm 34 slidable axially of the lead screw 29, and is movably biased toward its home position by a spring 35.

A ratchet gear 36 is mounted on the left end portion of the lead screw 29 and is in mesh engagement with a sheet feeding gear 38 through a clutch gear 37 including a one-way clutch. The sheet feeding gear 38 is fixed to one end of the rubber roller shaft 22.

The clutch gear 37 is designed so as to rotate only in the sheet feed direction of the recording sheet 26. A ratchet roller 39 formed with an internal thread 39a adapted to fit to the lead screw 29, like the carriage 30, is fitted to the lead screw 29 between the ratchet gear 36 and the carriage 30.

The ratchet roller 39 and the ratchet gear 36 are biased by a spring 40 in a direction in which they are spaced apart from each other, and pawl portions 41 and 42 engageable with each other only in the sheet feed direction are provided on the surfaces of the ratchet roller and the ratchet gear which are opposed to each other.

The ratchet roller 39 and the ratchet gear 36 are in contact with each other and the pawl portions 41 and 42 are engaged with each other, whereby the rotation of the ratchet roller 39 in one direction (the sheet feed direction) may be transmitted to the ratchet gear 36.

The set surface 43 of the set arm 34 which is opposite to the carriage 30 performs the function of pushing the ratchet roller 39 leftwardly and bringing the ratchet gear 36 and the ratchet roller into contact with each other when the carriage 30 has come near its home position.

Operation of the printing apparatus according to the present embodiment constructed as described above will now be described.

Figure 2A:
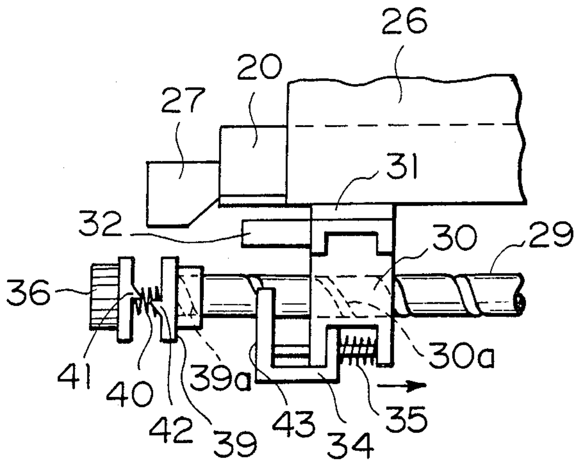
FIGS. 2A and 2B are an enlarged plan view and a side view, respectively, of the essential portions of the FIG. 1 apparatus during the operation thereof.
Figure 2B:
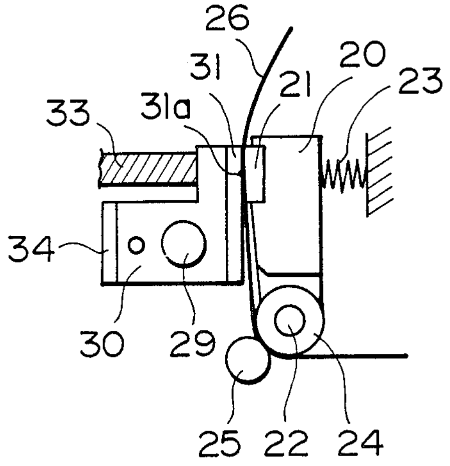

During the printing operation, as shown in FIGS. 2A and 2B, the projection 32 projectedly provided on the carriage 30 is out of engagement with the engaging portion 27 provided at the left end of the platen holder 20. So, the platen holder 20 is pushed by the spring 23 to thereby urge the platen 21 against the thermal head 31 with the recording paper 26 interposed therebetween.

When, in this state, the motor 28 is revolved in the forward direction, the lead screw 29 rotates so that the carriage 30 is moved rightwardly as viewed in FIG. 1 and therefore, the thermal head 31 is moved while being urged against the recording paper 26, and the heat generating element 31*a* generates heat in accordance with the image information signal from the CPU 52, whereby printing is effected on the recording sheet 26.

When the printing up to the end position of a predetermined line is terminated in this manner, the motor 28 is now revolved in the reverse direction and the thermal head 31 returns to its home position with the carriage 30.

At this time, the ratchet roller 39 and the ratchet gear 36 are spaced apart from each other by the spring 40 and therefore, the rotation of the lead screw 29 is not transmitted to the ratchet gear 36 and sheet feeding is not effected.

Figure 3A:
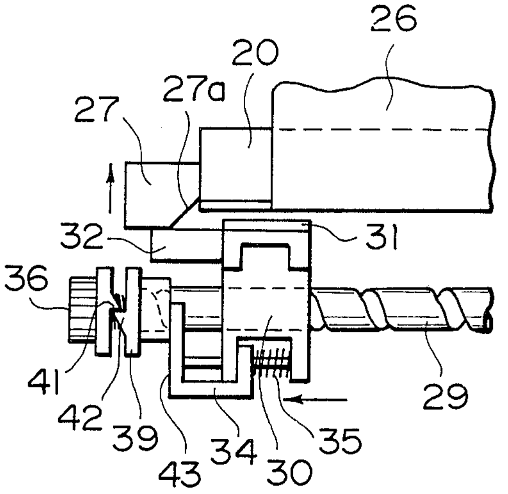
FIGS. 3A and 3B are an enlarged plan view and a side view, respectively, of the essential portions when a carriage has returned to its home position.
Figure 3B:
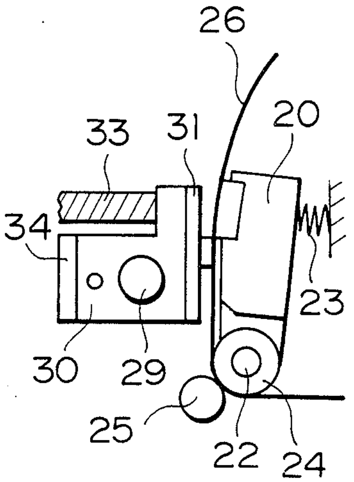

When the carriage 30 comes near its home position, the projection 32 first comes into contact with and rides onto the cam surface 27*a* of the engaging portion 27, as shown in FIGS. 3A and 3B. The carriage 30 can move only axially of the lead screw 29 and therefore, the engaging portion 27 is pushed by the projection 32 and the platen holder 20 is rotated away from the thermal head 31 against the resilient force of the spring 23.

On the other hand, when the carriage 30 comes near its home position, the set surface 43 of the set arm 34 pushes the ratchet roller 39 leftwardly as shown in FIG. 3A and therefore, the ratchet roller 39 and the ratchet gear 36 come into contact with each other and the pawl portions 41 and 42 become engaged with each other. The carriage 30 is then in its home position.

Figure 4:
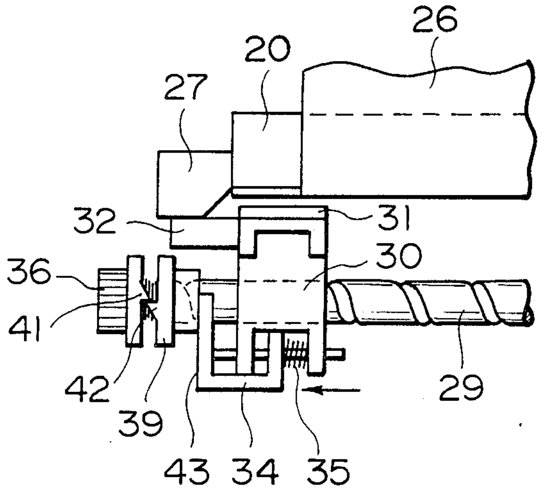
FIG. 4 is an enlarged plan view of the essential portions during the sheet feeding operation.

When the lead screw 29 is further rotated, the carriage 30 moves beyond the printing range further leftward of its home position, as shown in FIG. 4. At this time, the set arm 34 keeps a position in which the ratchet roller 39 and the ratchet gear 36 have been brought into contact with each other and therefore, the rotation of the lead screw 29 is transmitted to the ratchet gear 36 and sheet feeding is effected. So, by properly choosing the gear ratio between the ratchet gear 36, the clutch gear 37 and the sheet feeding gear 38, sheet feeding by one line can be accomplished, for example, by one full rotation of the lead screw 29.

Accordingly, by controlling the amount of rotation of the lead screw 29, i.e., the amount of leftward movement of the thermal head 31 from its home position, by the control signal from the CPU 52, the amount of feed of the recording sheet 26 can be controlled.

During the sheet feeding, the platen 21 and the thermal head 31 are separate from each other and therefore the thermal head 31 does not interfere with the sheet feeding.

After the sheet feeding has been effected in this manner, the lead screw 29 is rotated in the forward direction and the carriage 30 is moved rightwardly to its home position.

At that time, the ratchet gear 36 tries to rotate in the reverse direction, but since the clutch gear 37 is in a direction in which it does not rotate, the force with which the ratchet roller 39 comes out of engagement with the ratchet gear 36 acts and the recording sheet 26 does not retrogress.

The principle of operation of the printing apparatus according to the present embodiment has been described above, and the actual operation will now be described with respect to each of the printing of ordinary characters and the printing of high-quality characters.

It is to be understood that eight heat generating elements 31*a* are provided in a vertical row on the thermal head 31.

Figure 5A:
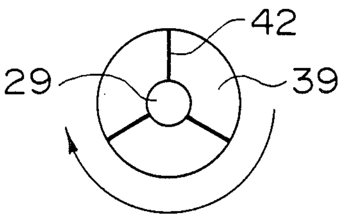
FIGS. 5A and 5B illustrate the sheet feeding operation and the printed state when the printing of ordinary characters is effected.
Figure 5B:
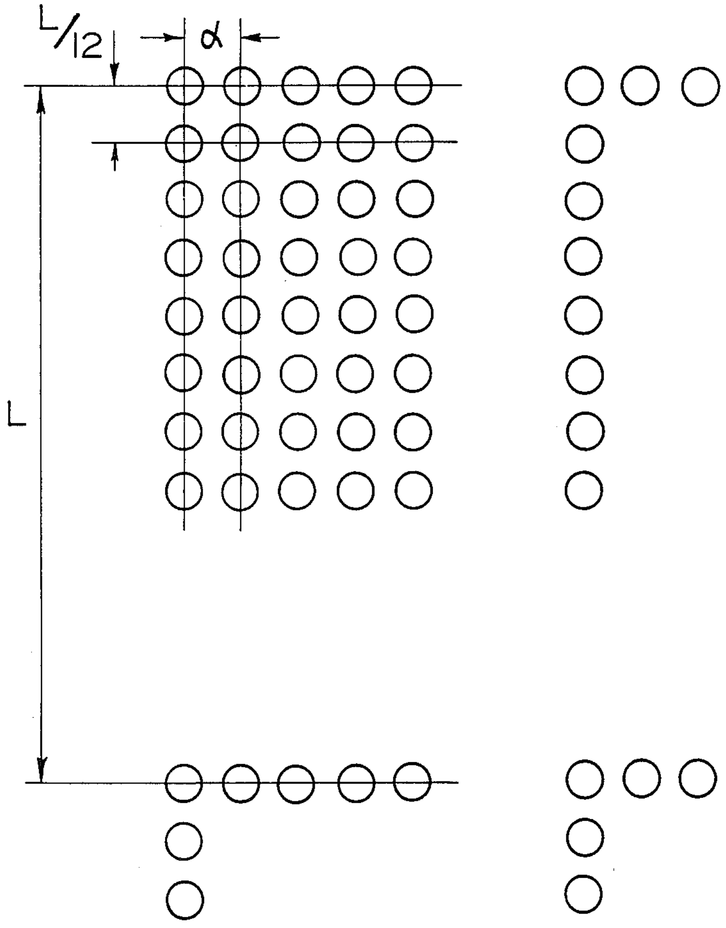

The line spacing in the case of the printing of ordinary characters is L as shown in FIG. 5B, and further, the dot spacing of the heat generating elements 31*a* of the thermal head 31 is determined to L/12 as shown in FIG. 5B.

Also, it is to be understood that the pawl portions 41 and 42 of the ratchet gear 36 and the ratchet roller 39 are provided equidistantly at three locations(see FIG. 5A). When printing of ordinary characters is to be effected under such a construction, the printing is effected while the carriage 30 is moved along the lead screw 29 at a dot spacing $\alpha$. In this embodiment, a character is comprised of vertical 8 dots X horizontal 5 dots. After the printing of a whole line has been terminated, the motor 28 is revolved in the reverse direction and the lead screw 29 is caused to made one full rotation in the sheet feed direction from the home position, whereby sheet feeding by one line corresponding to the line spacing L of the printing of ordinary characters is accomplished.

Figure 6A:
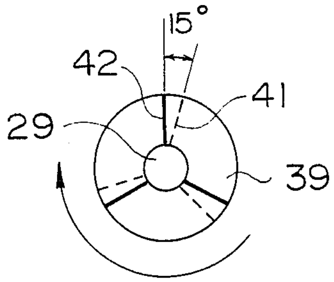
FIGS. 6A and 6B illustrate the sheet feeding operation and the recorded state when the printing of high-quality characters is effected.
Figure 6B:
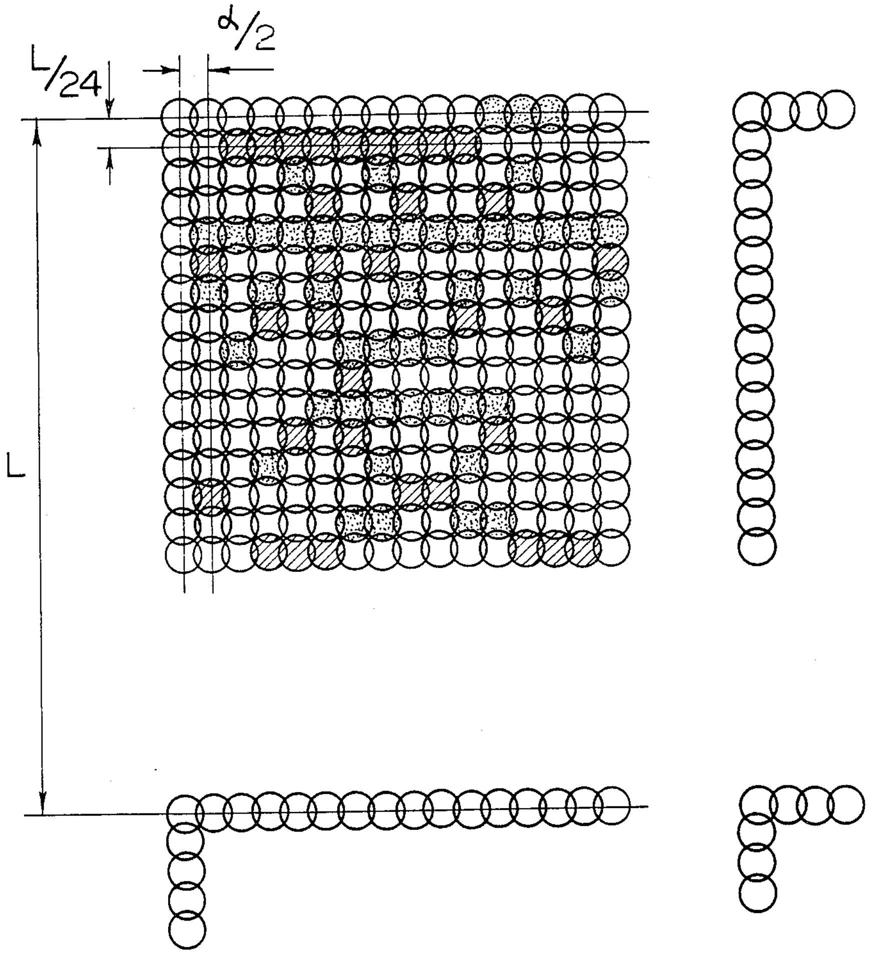

Next, in the case of the printing of high-quality characters, the first printing is effected while the carriage 30 is moved along the lead screw 29 at a dot spacing $\alpha/2$ which is double the density in the case of ordinary characters. The black circular marks shown in FIG. 6B correspond to this.

In this embodiment, a character is comprised of vertical and horizontal 16 dots.

When the first printing has been terminated, the motor 28 is revolved in the reverse direction and the lead screw 29 is caused to make 1/24 of one full rotation in the sheet feed direction from the home position, whereby sheet feeding by line spacing corresponding to vertical ½ dot is accomplished. This rotation of the lead screw 29 is accomplished by the control signal from the CPU 52.

The clutch gear 37 is designed so as not to rotate in the direction reverse to the sheet feed direction even if the motor 28 is revolved in the forward direction to return the carriage 30 to its home position and therefore, the ratchet gear 36 maintains a position in which it has made 1/24 of one full rotation.

Further, the second printing is effected while the carriage 30 is moved along the lead screw 29 at a dot spacing $\alpha/2$. The circular marks with hatching shown in FIG. 6B corresponds to this.

When the printing of a whole line has been terminated in this manner, the motor 28 is revolved in the reverse direction to cause the lead screw 29 to make one full rotation in the sheet feed direction from the home position.

At this time, the pawl portions 41 and 42 of the ratchet gear 36 and the ratchet roller 39 are not in mesh engagement with each other until the ratchet roller 39 makes 1/24 of one full rotation and therefore, the ratchet roller 39 does not rotate. Thus, the ratchet gear 36 makes 23/24 of one full rotation.

The sheet feeding by one line corresponding to the line spacing L has been effected when the first and the second printing and the sheet feeding have been terminated.

Figure 8:
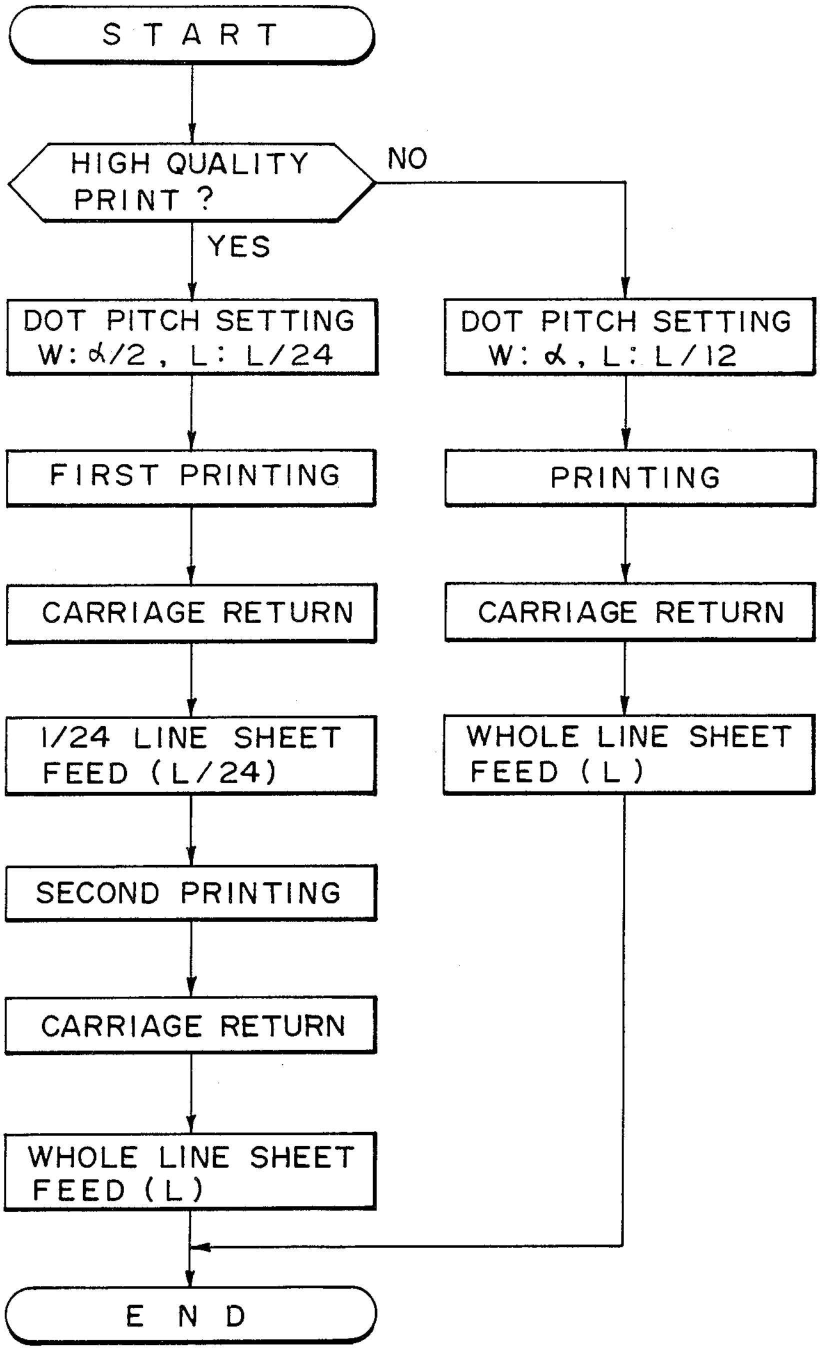
FIG. 8 is a flow chart of the present embodiment.

A block diagram and a flow chart of the present embodiment are shown in FIGS. 7 and 8, respectively.

Reference is now had to the block diagram of FIG. 7 to describe the control method of the printing apparatus according to the present embodiment. A dot driving signal DS is imparted from a printer control circuit 50 to the thermal head 31 by a printing control signal PS input from a host computer or a host circuit (in the present embodiment, the CPU 52) and desired printing is effected on the recording sheet 26.

Simultaneously therewith, a motor driving signal MS is imparted from the printer control circuit 50 to the motor 28 and movement of the carriage 30 is effected. When the printing of a whole line is terminated, the motor driving signal MS is reversed to revolve the motor 28 in the reverse direction and thereby return the carriage 30 to its home position. Whether the carriage 30 has returned to its home position is judged by the fact that a home position signal HS put out from a position detector 51 provided at the home position is input to the printer control circuit 50.

When the carriage 30 has returned to its home position, the reverse revolution of the motor 28 is further continued and the pawl portions 41 and 42 of the ratchet gear 36 and the ratchet roller 39 come into mesh engagement with each other and the sheet feeding operation is effected.

When the sheet feeding by one line is effected, the motor 28 is revolved in the forward direction by the motor driving signal MS to thereby return the carriage 30 to its home position, whereupon the printing of a whole line and the sheet feeding by one line are terminated.

The printing control signal PS includes information indicating when printing starts, the kind of printed characters, designation of the quality of printing, the amount of sheet feed and the printing termination. Accordingly, where the high-quality characters are designated in the printing control signal PS, the necessary dot signal DS and motor driving signal MS are input to the thermal head 31 and the motor 28, respectively, by the printer control circuit 50.

Accordingly, in the present embodiment, the amount of feed of the recording sheet 26 can be controlled by controlling the amount of further leftward movement of the head 31 from the home position.

The flow chart of the present embodiment is shown in FIG. 8.

When the printing of ordinary characters is designated by the printing control signal PS, the printer control circuit 50 discriminates the designation of the quality of printing and sets the dot pitch. That is, the dot pitch in the widthwise direction $\alpha$ and the lengthwise direction L/12 is set. Thereafter, a series of printing and sheet feeding operations are effected in accordance with the order of the description of the block diagram of FIG. 7.

Next, when the printing of high-quality characters is designated by the rinting control signal PS, the printer control circuit 50 discriminates the designation of the quality of printing and sets the dot pitch. That is, the dot pitch in the widthwise direction $\alpha/2$ and the lengthwise direction L/24 is set. Thereafter, the widthwise odd-numbered dot information of printed characters is input from the printer control circuit 50 to the thermal head 31 and the first printing operation is effected. When the printing of a whole line is terminated, the motor 28 is revolved in the reverse direction to thereby effect the carriage return operation in which the carriage 30 is returned to its home position.

Further, the reverse revolution of the motor 28 is continued to effect 1/24 line sheet feed (L/24 pitch), thus terminating the first printing operation.

Next, the lengthwise even-numbered dot information of printed characters is input from the printer control circuit 50 to the thermal head 31 and the second printing operation is effected. When the printing of a whole line is terminated, the motor 28 is revolved in the reverse direction to thereby effect the carriage return operation in which the carriage 30 is returned to its home position. Further, the reverse revolution of the motor 28 is continued to thereby effect whole line sheet feed (L pitch), thus terminating the second printing operation.

Thus, the printing of a whole line of high-quality characters is realized by two printing and sheet feeding operations.

Here, 1/24 line sheet feed is effected during the first printing operation and therefore, there is a back-lash of 1/24 line between the pawl portions 41 and 42 of the ratchet roller 39 and the ratchet gear 36 when whole line sheet feed is effected during the second printing operation and thus, the result is that sheet feed by a total one line has been effected.

As is apparent from the foregoing description, according to the present embodiment, there can be provided a compact and inexpensive printing apparatus in which a cycle of printing can be accomplished by forward and reverse revolutions of a motor and to accomplish the printing of a whole line, the thermal head is caused to made two reciprocations in the widthwise direction of the recording sheet and the amounts of sheet feed after the first printing and after the second printing are changed, whereby dot printing of double density can be executed to thereby enable printing of high quality to be accomplished.

The present invention is not restricted to the above-described embodiment, but is of course applicable also to impact printers, ink jet printers and the like. Further, the present invention is not restricted to a recording apparatus for recording such images as characters and numerals, but is widely applicable to recording apparatuses for recording such images as figures. Also, the above-described embodiment has been shown as an example in which the quality of image is changed over into two stages, whereas this is not restrictive, but the number of desired qualities of image can be suitably selected. Further, in the present invention, the sheet is not limited to recording paper, but may also be a plastic sheet or the like. Furthermore, in the present invention, a thermal head or a wire dot can be suitably applied as the head.

As described above, the present invention provides a recording apparatus which improves the quality of image.

I claim:

1. A recording apparatus comprising:

a recording head for recording an image on a sheet;

moving means providing a drive force for reciprocally scanning said recording head along successive recording lines across the sheet;

conveyance means for conveying the sheet;

transmission means including a rotatable member having a plurality of first engaging portions angularly displaced from each other at predetermined locations;

transfer means having a plurality of second engaging portions, said transfer means being displaceable in response to the movement of said recording head so as to cause the first and second engaging portions to engage, wherein said transfer means is arranged for transferring the drive force provided by said moving means to said transmission means to transmit the drive force to said conveyance means; and control means for controlling said transfer means so that after a first recording scan across the sheet by said recording head, said transfer means performs a first rotation by an angle less than that formed by the first engaging portions, then said record head effects a second recording scan, and thereafter said transfer means effects a second rotation by an angle corresponding to a predetermined pitch between recording lines irrespective of said first rotation angle.

2. A recording apparatus according to claim 1, wherein said recording head records a matrix of dots on the sheet and the angle that said control means rotates said transfer means after the first recording scan corresponds to one half the pitch between dots.

3. A recording apparatus according to claim 1, further comprising a rotatable member which supports the sheet and which retracts the sheet when the first and second engaging portions are engaged.

* * * * *